(12) United States Patent
Ulutürk et al.

(10) Patent No.: US 10,647,048 B2
(45) Date of Patent: May 12, 2020

(54) METHOD AND DEVICE FOR TEMPERING PREFORMS

(71) Applicant: KHS CORPOPLAST GMBH, Hamburg (DE)

(72) Inventors: Deniz Ulutürk, Hamburg (DE); Jens-Peter Rasch, Ahrensburg (DE); Frank Haesendonckx, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 348 days.

(21) Appl. No.: 15/306,578

(22) PCT Filed: Apr. 21, 2015

(86) PCT No.: PCT/EP2015/000825
§ 371 (c)(1),
(2) Date: Oct. 25, 2016

(87) PCT Pub. No.: WO2015/165575
PCT Pub. Date: Nov. 5, 2015

(65) Prior Publication Data
US 2017/0043521 A1 Feb. 16, 2017

(30) Foreign Application Priority Data
May 2, 2014 (DE) .......................... 10 2014 006 275

(51) Int. Cl.
*B29C 49/64* (2006.01)
*B29C 49/78* (2006.01)
*B29C 49/68* (2006.01)

(52) U.S. Cl.
CPC .......... *B29C 49/6409* (2013.01); *B29C 49/64* (2013.01); *B29C 49/6418* (2013.01); *B29C 49/68* (2013.01)

(58) Field of Classification Search
CPC ....... B29C 49/68; B29C 49/64; B29C 49/786; B29C 2949/78663; B29C 2949/78151;
(Continued)

(56) References Cited

U.S. PATENT DOCUMENTS 6,361,301 B1 * 3/2002 Scaglotti ............. B29C 49/6445
264/454
7,491,358 B2 2/2009 Gernhuber et al.
(Continued)

FOREIGN PATENT DOCUMENTS

EP 2380719 A2 10/2011
EP 2537664 A1 12/2012
WO 02087850 A1 11/2002

OTHER PUBLICATIONS

International Search Report dated Jul. 31, 2015 (Year: 2015).*

*Primary Examiner* — Joseph S Del Sole
*Assistant Examiner* — Jerzi H Moreno Hernandez
(74) *Attorney, Agent, or Firm* — Lucas & Mercanti, LLP; Klaus P. Stoffel

(57) ABSTRACT

A method for tempering preforms in a blowing machine, wherein at least one heating box is arranged along a transport path for the preforms. The heating box has reflective walls and forms a heating channel through which the preforms are guided. The heating box also has a heater for heating the preforms in the heating channel, and a cooling device, having a blower, for cooling the reflective walls. The walls are cooled by a quantity of air flowing along the walls outside the heating channel. The heating output of the heater is adjustable. A control device provides open-loop and closed-loop control of the cooling output produced by the cooling device, in particular the supplied quantity of air, depending on the respective heating output of the heater, depending on a measurement of the heating output.

13 Claims, 5 Drawing Sheets

(58) Field of Classification Search
CPC .... B29C 2949/78386; B29C 2049/283; B29C 49/06; B29K 2067/003
See application file for complete search history.

(56) References Cited

U.S. PATENT DOCUMENTS

| | | | |
|---|---|---|---|
| 2005/0081542 A1* | 4/2005 | Braun | F01P 7/048 62/186 |
| 2006/0029843 A1* | 2/2006 | Heimburger | H01M 8/04007 429/431 |
| 2008/0099961 A1* | 5/2008 | Feuilloley | B29B 13/024 264/405 |
| 2010/0127435 A1 | 5/2010 | Feuilloley | |
| 2010/0200560 A1* | 8/2010 | Deyerl | B29B 13/024 219/385 |
| 2010/0314806 A1* | 12/2010 | Haesendonckx | B29C 49/6436 264/535 |
| 2011/0300497 A1* | 12/2011 | Derrien | B29B 13/024 432/1 |
| 2012/0267357 A1* | 10/2012 | Monteix | B29B 13/024 219/411 |
| 2012/0269918 A1* | 10/2012 | Winzinger | B29B 13/024 425/174.4 |
| 2012/0326345 A1* | 12/2012 | Gendre | B29C 49/78 264/40.1 |
| 2014/0197581 A1* | 7/2014 | Lappe | B29C 49/64 264/535 |
| 2016/0368197 A1* | 12/2016 | Takahashi | B29C 49/68 |

* cited by examiner

METHOD AND DEVICE FOR TEMPERING PREFORMS

The present application is a 371 of International application PCT/EP2015/000825, filed Apr. 21, 2015, which claims priority of DE 10 2014 006 275.9, filed May 2, 2014, the priority of these applications is hereby claimed and these applications are incorporated herein by reference.

BACKGROUND OF THE INVENTION

The invention pertains to a method and a device for tempering preforms in a blow-molding machine with a heating channel comprising reflective walls, the channel being formed by a heating box. The preforms are conducted through this heating channel so that they can be tempered to the blow-molding temperature. The heating box comprises heating means for heating the preforms. The heating box also comprises a cooling device comprising at least one blower. The cooling device serves to cool the reflective walls of the heating channel, in particular by means of a quantity of air flowing along the walls only outside the heating channel, wherein the heating output of the heating means is adjustable.

Such methods and devices are known from the prior art and are used, for example, in blow-molding machines sold by the applicant for the thermal conditioning of preforms prior to the blow-molding process.

The goal of such methods and devices is to bring the preforms, usually produced by injection molding, to the proper temperature for the following blow-molding step. In the case of PET, for example, this temperature is approximately 120° C. and must be maintained within a narrow range to avoid changes to the material resulting from overstretching or phase transitions of the material. The preforms are also usually given a certain temperature profile.

During the operation of such methods and devices, the preforms are heated by, for example, the radiant heat produced by radiant heaters. IR heaters and/or NIR heaters are preferably used. Radiation passing between the preforms or radiation not absorbed on passage through the preform is thrown back by the reflective walls of the heating channels to increase the efficiency of the heating boxes and to improve the depthwise heating of the preform material. As an unavoidable result, the reflective walls of the heating channels also heat up.

The walls of the heating channels usually consist of aluminum materials, which are good reflectors of radiation in the IR and/or NIR range. At temperatures above 180° C., however, such materials tend to corrode more readily and must therefore be cooled.

Methods and devices are known in which the preforms, as they are transported through the heating section formed, for example, by several heating channels arranged in succession in the transport direction, are subjected to cooling air, which is supplied through openings in the walls. This type of heating device of a blow-molding machine is described in, for example, US 2011/0300497 A1. In this blow-molding machine, the cooling air discharged toward the preforms has the primary effect of cooling the preforms, which is, after all, the purpose of the cooling. Air flowing past the preforms also acts on the walls of the radiant heater and thus also cools them. The heating output of the radiant heater and the cooling air output are specified permanently in an advance to achieve the desired temperature profile of the preforms.

In the case of the method and devices of the class in question, the desired temperature profile of the preforms is achieved by the appropriate adjustment of the radiant heaters. Active cooling of the area of the preforms to be tempered is not usually necessary, which means that there is no need to supply cooling air into the heating channel. It is known from the prior art, however, that the neck area of the preform can be actively cooled.

In the case of methods and devices of the class in question, the reflective walls are usually cooled by passing cooling air along them. To avoid an overheating of the reflector walls reliably, the cooling is adjusted in such a way that the critical temperature is not reached at maximum heating output of the radiant heaters. It is known that the cooling output can be manually adjusted when necessary.

Because different preforms with different temperature behavior are processed in blow-molding machines and because they are processed at different speeds, the heating output of the heating means of the heating channel must be adjustable. In the prior art, such heating is subjected to open-loop or closed-loop control as a function of various parameters. During operation of the blow-molding machine, all of the heating means are never set at their maximum output. Because the previously known cooling devices, however, are configured and operated in such a way that overheating of the reflective walls is prevented at all times, i.e., even in the case of maximum heating output, the cooling output is overdimensioned with respect to the heating output actually supplied during operation of the machine.

Heat is obviously withdrawn from the heating channel by the cooling device, as a result of which the efficiency of the heating device is decreased, wherein the relative heat losses becomes especially large precisely at reduced heating output levels.

SUMMARY OF THE INVENTION

It is therefore the goal of the invention to provide a method and a device for tempering preforms in a blow-molding machine which offer improved efficiency especially at reduced heating output levels.

This goal is achieved according to the invention by a method and by a device in which a control device is provided, which is configured to control, in open-loop or closed-loop fashion, the cooling output produced by the cooling device, e.g., the quantity of cooling air being conveyed, as a function of the associated heating output of the heating means of the heating channel. To this end, this heating output can be detected, for example, and sent to the control device as a measurement variable.

As a result of a previously unknown approach to the open-loop or closed-loop control of the quantity of air conveyed by the cooling device as a function of the associated heating output of the heating box, it is possible to cool the reflective walls only to the extent that is actually necessary—and thus to withdraw only enough heat from the heating channel as is actually necessary—to maintain the material-related temperature limits of the walls.

According to the invention, preferably several heating boxes are arranged along the transport path, one after the other in the transport direction, to form the heating section. Each heating box could comprise its own cooling device and/or its own control device. A heating box of this type with integrated cooling and/or control could be called a "heating module" and would comprise a structure more complex than that of the previously conventional heating boxes, which do not comprise an integrated cooling device and have no complex control. It is also possible, however, to use the previously conventional heating boxes and to link them to an associated cooling device and to an associated control device. These assigned associated cooling devices and/or control device can be assigned simultaneously to several of the conventional heating boxes. All these variants are an object of the claimed invention.

During the blow-molding step following tempering, only the vessel area of the preforms to be stretched and expanded is shaped, whereas the neck area forming the opening of the container has already acquired its final form during the injection-molding step. Because the neck area is used to hold the preform in place during the blow-molding step, and because it should be protected from undesirable deformation, the neck area must usually be protected from excessive heating during the thermal conditioning of the preform. To this end, screens are used to protect the neck area from the thermal radiation supplied in the heating channel. According to an elaboration of the invention, furthermore, a portion of the cooling output supplied by the cooling device, e.g., a portion of the conveyed air quantity, is used to cool the neck area of the preforms, in that this cooling air is conducted along it.

In a preferred variant of the method according to the invention and of the device according to the invention, temperature sensors are provided to monitor the temperature of the reflective walls and/or of the neck area of the preforms. These temperature sensors make it possible to monitor the various temperatures in question and can thus help to increase the accuracy of the open-loop or closed-loop control of the cooling output and to achieve a disadvantageous overheating of the walls and/or of the neck area of the preforms at reduced cooling output.

For the open-loop or closed-loop control of the cooling output, e.g., of the conveyed cooling air quantity, various technical solutions can be considered. In a preferred embodiment of the method according to the invention and of the device according to the invention, the cooling device comprises for this purpose at least one blower, for example, which comprises a speed-controlled motor. The adjustable-speed blower thus obtained makes it possible in particular to set the conveyed air quantity directly, reproducibly, and in linear fashion.

According to another embodiment of the device according to the invention, the cooling device comprises at least one throttle valve, which influences the quantity of the cooling air being conveyed. By means of a throttle valve of this type, which in particular can be configured as an automatically controlled throttle valve, the conveyed air quantity can be adjusted very easily.

In a preferred variant of a method according to the invention or of a device according to the invention, the control device is configured to adjust the conveyed air quantity according to a preset characteristic curve as a function of the associated heating output of the heating box. As understood according to the invention, a "preset characteristic curve" means in particular that a defined conveyed air quantity is specified for each settable heating output of the heating box. In this way a control device with a simple construction can be configured.

According to a preferred elaboration of the invention pertaining to the method or to the device, several separately controllable heating boxes with heating means are provided, the several heating channels of which form the heating section for the preforms, and the control device is configured to adjust the conveyed air quantity according to a preset family of characteristics as a function of the associated heating outputs of the heating means of the individual heating boxes.

Especially in the case of high-throughput blow-molding machines, it is advantageous for the heating section to be formed by several heating boxes which can be controlled separately. For example, not all the heating boxes are operated at the same output. Individual heating boxes can operate at reduced output, for example, or be turned off partially or completely, whereas other heating boxes operate at high or full output. By means of the described elaboration, it is possible, for example, on the basis of the operational output pattern of the several heating boxes, to select a certain curve from the family of characteristics, which then, based on the total heat output setting, is used to determine the air quantity to be conveyed, i.e., the cooling output to be supplied.

In a preferred variant of the method according to the invention or of the device according to the invention, the control device is configured to increase the conveyed air quantity when the temperatures in the reflective walls and/or of the neck areas of the preforms are above critical temperatures, which have been determined in advance in the individual case.

It is also possible to configure the control device in such a way that it transitions to a characteristic curve signifying a lower cooling output until a preset critical limit temperature is reached.

In this way, the characteristic curves can be selected in such a way that the conveyed air quantities determined according to the curves are large enough to keep the wall temperature and/or the neck temperature below the predetermined critical temperatures. During operation of the blow-molding machine, the cooling output, i.e., the conveyed air quantity, can then be further reduced in steps or continuously until the critical temperatures are reached. The predetermined critical temperatures are preferably selected in such a way that there is still a sufficient safety margin present versus the temperatures at which negative effects can be expected.

If the measured temperatures increase as a result of a change in the operating state of the blow-molding machine, the control device can increase the cooling output again, e.g., the conveyed air quantity, until the temperatures drop below the critical value again.

The invention is explained below in greater detail on the basis of exemplary embodiments, which are illustrated in the figures:

DETAILED DESCRIPTION OF THE DRAWING

Figure 1:
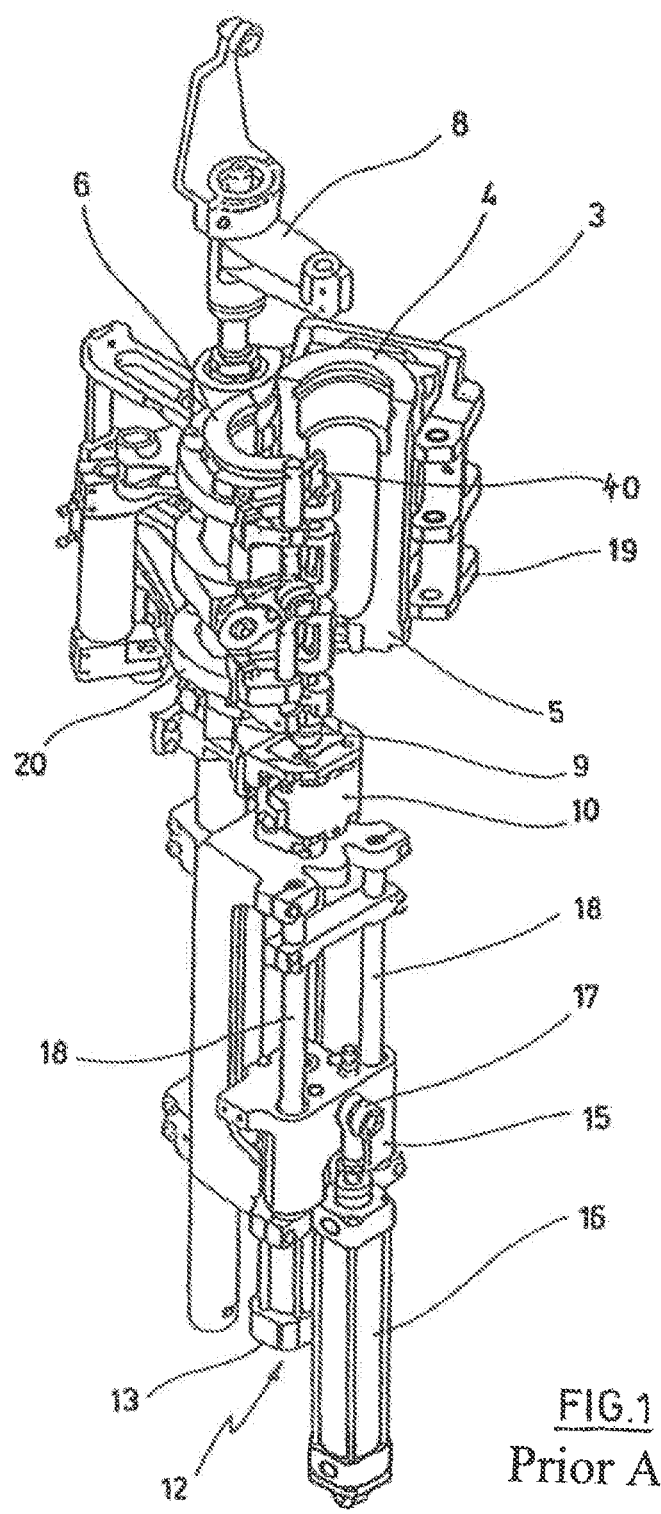
FIG. 1 shows a perspective view of a blow-molding station for the production of containers from preforms.
Figure 2:
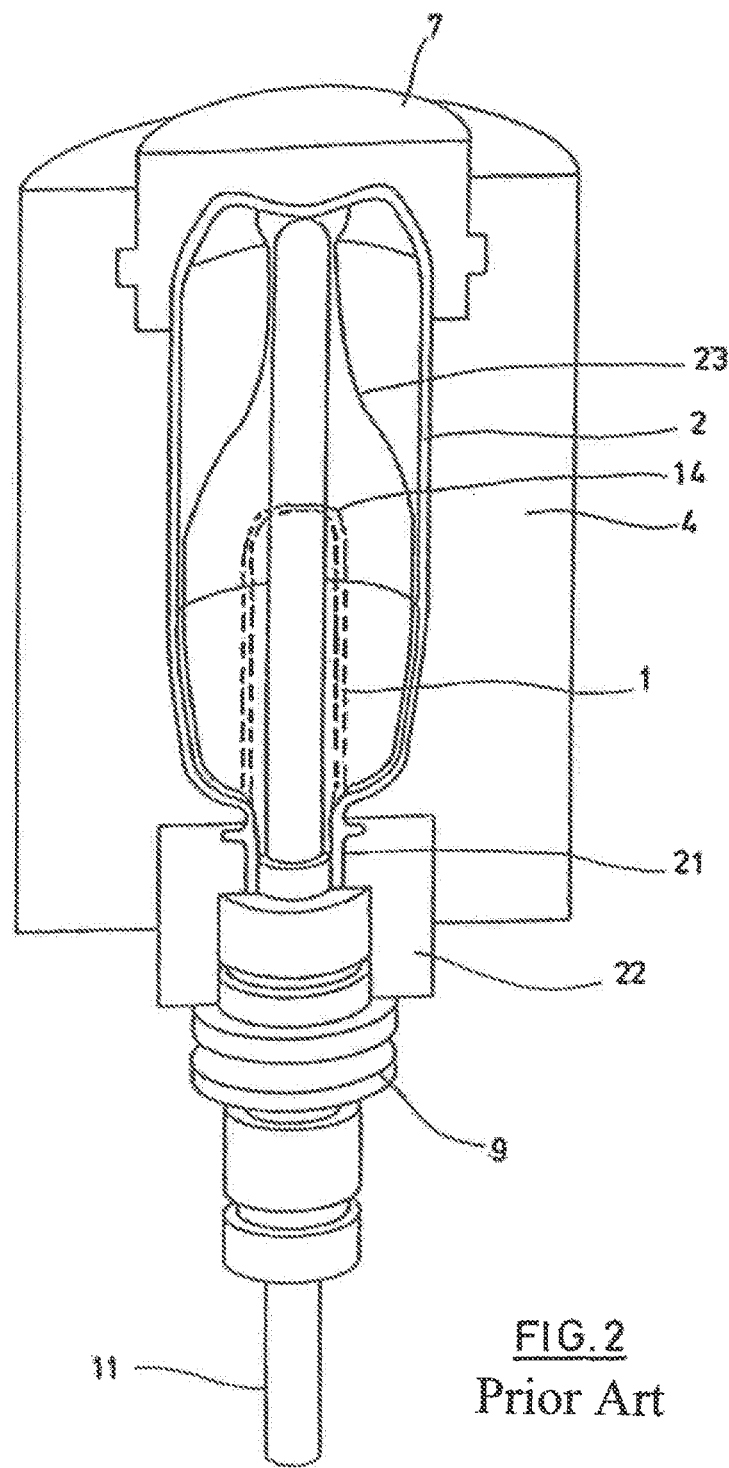
FIG. 2 shows a longitudinal cross section through a blow mold, in which a preform is stretched and expanded.

The basic structure of a device for shaping preforms 1 into containers 2 is illustrated in FIGS. 1 and 2.

The device for molding the container 2 consists essentially of a blow-molding station 3, which is provided with blow mold 4, into which a preform 1 can be inserted. The preform 1 can be—without limitation to the generality of the concept—an injection-molded part of polyethylene terephthalate (PET). Other suitable thermoplastic materials of which the preform can consist are also known. So that the preform 1 can be inserted into the blow mold 4 and so that the finished container 2 can be removed from the mold, the blow mold 4 consists of mold halves 5, 6 and of a bottom part 7, which can be positioned by a lifting device 8. The preform 1 can be held in the area of the blow-molding station 3 by a transport mandrel 9, which passes through a plurality of treatment stations within the device in common with the preform 1. It is also possible, however, for the preform 1 to be inserted directly into the blow mold 4 by means of grippers or some other handling means.

To make it possible to supply compressed air, a connecting piston 10 is arranged underneath the transport mandrel 9; this piston supplies compressed air to the preform 1 and simultaneously provides a seal against the transport mandrel 9. In a modified configuration, however, it is also possible to use fixed compressed air lines.

In this exemplary embodiment, the preform 1 is stretched by means of a stretching rod 11, which is positioned by a cylinder 12. According to another embodiment, the stretching rod 11 is positioned mechanically by the use of curved segments, upon which tracking rollers act. The use of curved segments is especially advisable in cases where a plurality of blow-molding stations 3 is arranged on a rotating blow-molding wheel.

In the embodiment shown in FIG. 1, the stretching system is configured in such a way that a tandem arrangement of two cylinders 12 is provided. First, before the start of the stretching process itself, a primary cylinder 13 moves the stretching rod 11 up as far as the area of the bottom 14 of the preform 1. During the stretching process itself, a secondary cylinder 16 or a cam control system moves the primary cylinder 13 with the stretching rod extending from it jointly with a slide 15 carrying the primary cylinder 13. In particular, it is advisable for the secondary cylinder 16 to be used under cam control in such a way that a guide roller 17, which slides along a curved path during the execution of the stretching process, defines the current stretching position. The guide roller 17 is pushed against the guide path by the secondary cylinder 16. The slide 15 slides along two guide elements 18.

After the mold halves 5, 6 arranged in the area of carriers 19, 20 have been closed, the carriers 19, 20 are locked together by means of a locking device 40.

To adapt the device to various shapes of the mouth section 21 of the preform 1, it is provided that separate threaded inserts 22 can be used in the area of the blow mold 4, as shown in FIG. 2.

In addition to the blown container 2, FIG. 2 also shows the preform 1 in broken line, and in schematic fashion, a growing container bubble 23.

Figure 3:
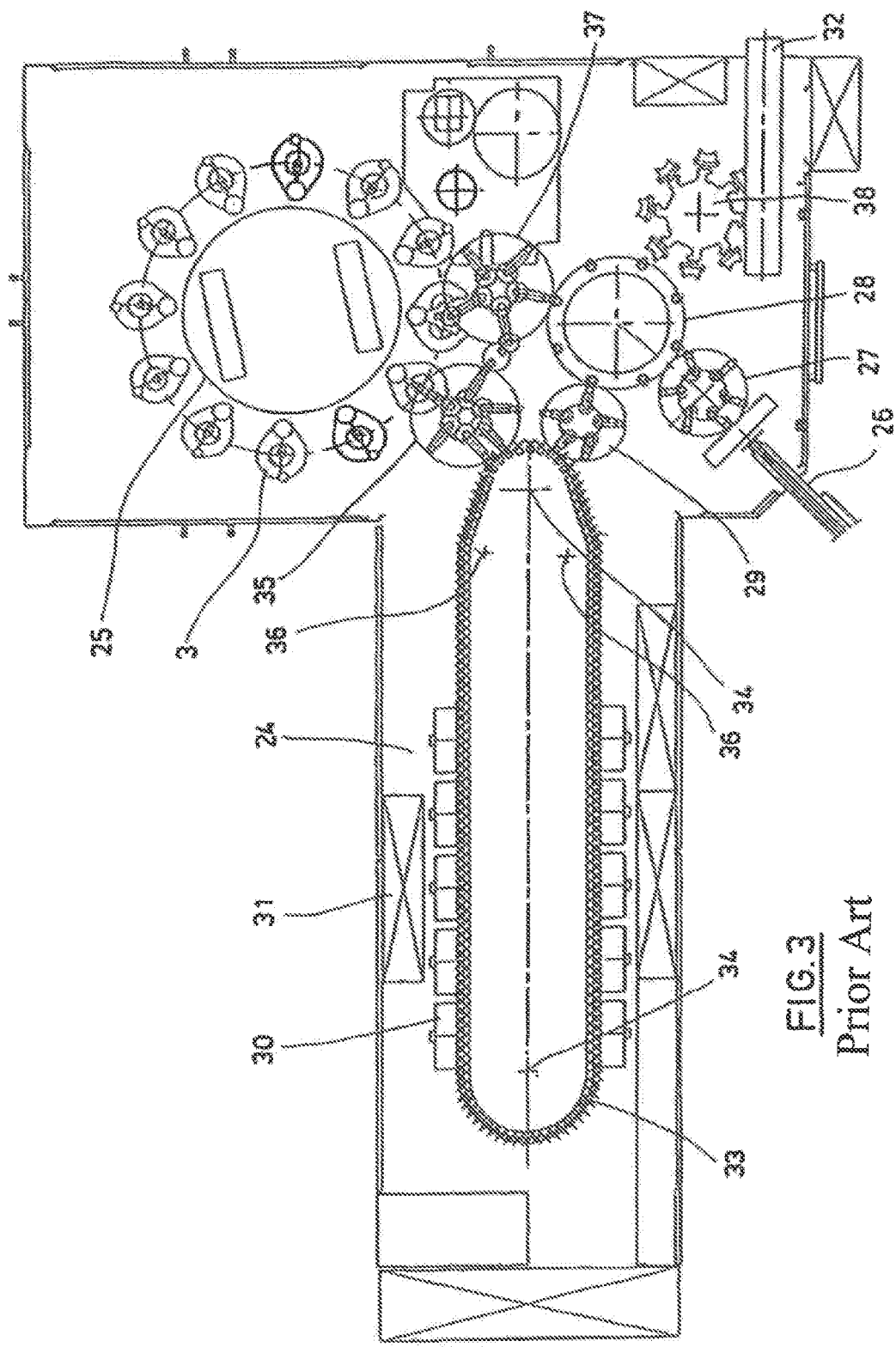
FIG. 3 shows a sketch illustrating the basic structure of a blow-molding machine for the blow-molding of containers.

FIG. 3 shows the basic structure of a blow-molding machine, which is provided with a heating section 24 and a rotating blow-molding wheel 25. Starting from a preform feed unit 26 the preforms 1 are transported into the area of the heating section 24 by transfer wheels 27, 28, 29.

Heating boxes 30 and blowers 31 are arranged along the heating section 24 to temper the preforms 1. After the preforms 1 have been adequately tempered, they are transferred to the blow-molding wheel 25, in the area of which the blow-molding stations 3 are arranged. The finish-blown containers 2 are sent to a discharge section 32 by additional transfer wheels. So that a preform 1 can be shaped into a container 2 in such a way that the container 2 has material properties capable of guaranteeing that the food products, especially beverages, carried within the container 2 have a long shelf life, special method steps must be executed during the heating and orientation of the preforms 1. In addition, advantageous effects can also be achieved by adherence to special sizing guidelines.

Various plastics can be used as the thermoplastic material. PET, PEN, or PP, for example can be used.

The expansion of the preform 1 during the orientation process is achieved by the application of compressed air. The compressed air feed is divided into a pre-blowing phase, in which a gas such as compressed air is supplied at a low pressure level, and a following main blowing phase, in which the gas is supplied at a higher pressure level. During the pre-blowing phase, typically compressed air is supplied at a pressure within the range of 10-25 bars, and during the main blowing phase, compressed air is supplied at a pressure in the range of 25-40 bars.

It can also be seen in FIG. 3 that, in the embodiment shown, the heating section 24 consists of a plurality of circulating transport elements 33, which are connected to each other like the links of a chain and which are guided by pulleys 34. What is envisioned in particular is that the chain-like arrangement will describe an essentially rectangular basic contour. In the embodiment shown here, a single relatively large pulley 34 is used in the area of the end of the heating section 24 facing the transfer wheel 29 and a feed wheel 35, and two deflecting pulleys 36 of comparatively smaller size are used in the area of the adjacent changes of direction. In principle, any other desired type of guide system can be used.

So that the transfer wheel 29 and the feed wheel 35 can be arranged as closely as possible to each other, the arrangement shown here turns out to be especially effective because three pulleys 34, 36 are positioned in the area of the corresponding end of the heating section 24, namely, the smaller pulleys 36 in the area of the transition to the linear paths of the heating section 24 and the larger pulley 34 in the area of the immediate transfer to the transfer wheel 29 and the feed wheel 35. As an alternative to the use of chain-like transport elements 33, it is also possible to use a rotating heating wheel, for example.

After the containers 2 have been finish-blown, they are guided out of the area of the blow-molding stations 3 by a removal wheel 37 and transported to the discharge section 32 by the transfer wheel 28 and a discharge wheel 38.

Figure 4:
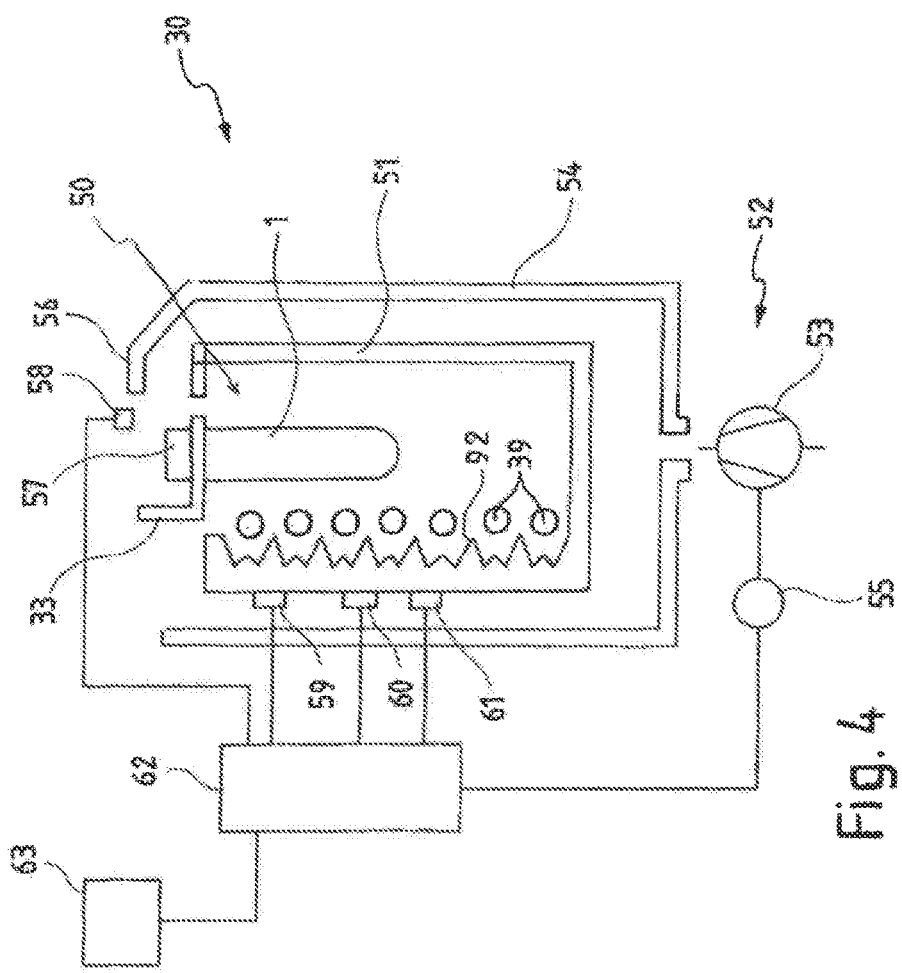
FIG. 4 shows a cross-sectional schematic diagram of a heating box.

In modern blow-molding machines, the heating section 24 usually comprises one or more heating boxes 30, which form a closed heating channel 50. FIG. 4 shows a schematic cross-sectional diagram of a heating box 30 with the heating channel 50 formed by it.

The heating box 30 comprises reflective walls 51, which enclose the heating channel 50. Several radiant heaters 39 are set up in a vertical arrangement, one above the other, in the heating box 30; they direct the thermal radiation toward a preform 1 in the heating channel 50, as the preform is traveling through the heating channel 50. In the area of the radiant heaters 39, the walls 51 comprise reflective structures 92, which throw the radiation emitted by the radiant heaters 39 in the direction facing away from the preforms uniformly back into the interior of the heating channel 50, e.g., back around the radiant heaters 39.

In the example shown, the preforms 1 are conveyed through the heating box 30 by transport elements 33.

To prevent the neck area of the preforms 1 and the walls 51 of the heating box 30 from overheating, a cooling device 52 is provided, which comprises a blower 53 and an air chest 54. The blower 53 is driven by a speed-controlled motor 55.

The air conveyed by the blower 53 flows through the air chest 54 and along the walls 51, thus cooling them. Some of the air conveyed by the blower 53 is conducted by deflecting means 56 onto the neck area 57 of the preform 1 to cool it.

In the area of the heating channel 50, several temperature sensors 58, 59, 60, 61 are arranged. The sensor 58 is configured as a pyrometer to measure the temperature of the neck area 57 of the preform 1. The sensors 59, 60, and 61 are configured to measure the temperature of the walls 51 of the heating channel 50. The sensor 59, for example, is configured as a PT100 sensor for the linear measurement of the wall temperature, whereas the sensors 60 and 61 are configured as simple bimetal switches. The signals of the temperature sensors 58, 59, 60, 61 are transmitted to a control device 62.

The heat output of the radiant heaters 39 is set by a system control unit 63 and transmitted to the control device 62. In addition to setting the overall output, the system control unit also specifies the power distribution between the individual radiant heaters arranged at different levels and between the several heating boxes 30 arranged along the heating section 24.

Figure 5:
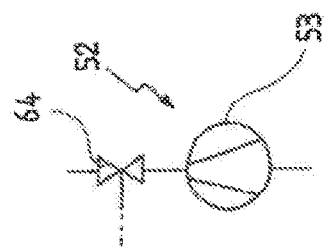
FIG. 5 shows a schematic diagram of one embodiment of a cooling device.

The control device 62 adjusts the quantity of air conveyed by the cooling device 52 on the basis of the heating output setting or heating output distribution setting of the radiant heaters 39. For this purpose, the control device 62 varies the rotational speed of the motor 55. In an alternative variant of the cooling device 52 shown in FIG. 5, a controllable throttle valve 64 is installed downstream from the blower 53; the conveyed air quantity is then regulated by this valve. In the case of alternative cooling devices, alternative actuators are to be provided to realize the desired setting of the cooling output.

Figure 6:
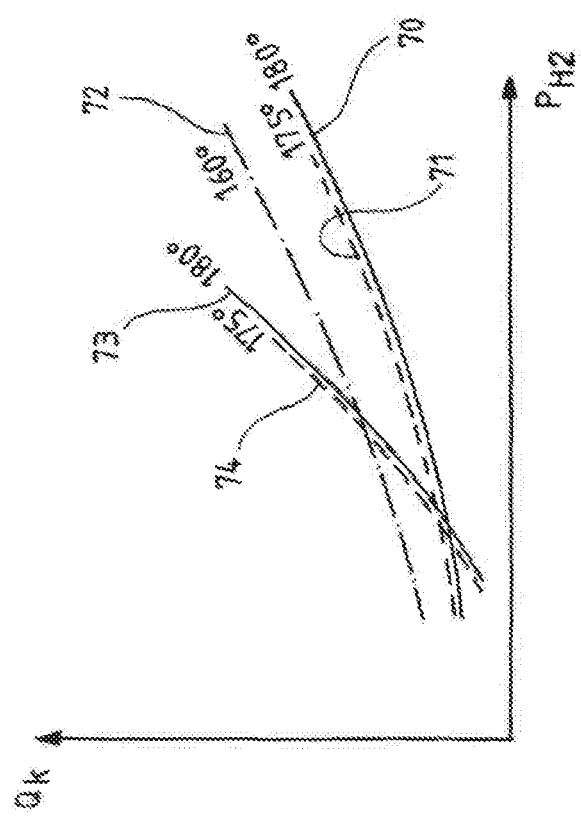
FIG. 6 shows a schematic diagram of a family of characteristics for setting the cooling air quantity of a cooling device.

FIG. 6 shows a family of characteristic curves. The conveyed air quantity $Q_K$ is plotted against the heat output $P_{HZ}$. For each characteristic curve, a certain cooling air quantity is assigned to a certain heat output.

A first solid characteristic curve 70 shows the air quantity which is required at various heating outputs to keep the temperature of the walls 51 at the critical temperature, which is approximately 180° C. in the case of standard aluminum materials. A first broken curve 71 shows the air quantity required to keep the temperature somewhat below the critical temperature, e.g., at 175° C., for the same heating output.

A dash-dot curve 72 shows an air quantity at which the temperature is even farther away from the critical point, e.g., at 160° C.

During the operation of the blow-molding machine, the control device 62 first sets an air quantity according to the curve 72, and the temperatures then obtained are detected by the temperature sensors 58, 59, 60. As long as a critical temperature is not reached, the air quantity is slowly reduced by the control device 62, as a result of which the detected temperatures increase. As soon as the temperatures of the walls 51 and/or of the neck area 57 of the preforms 1 approach the critical temperatures too closely, the current air quantity setting is kept constant or increased again.

The monitoring of the critical temperature of the wall 51 is realized here by means of the simple bimetal switches 60, 61. The bimetal switch 60 is dimensioned in such a way that it switches at a temperature which is still below the critical temperature, i.e., at 175° C. As long as the bimetal switch 60 is closed, the control device 62 can continue to reduce the air quantity. As soon as the bimetal switch 60 reaches its switching temperature and opens, the air quantity must be maintained. The bimetal switch 61 is set to the actual critical temperature of the wall 51, e.g., to 180° C., and it causes an emergency shut-off when its switching temperature is reached, since this means that there is a malfunction in the control device 62.

The monitoring of the critical temperature of the neck area 57 of the preform 1 is achieved by the pyrometer 58.

In the case of a different heat output distributions of the several heating boxes 30, the curves 73, 74 for the cooling air quantities to be introduced to maintain the desired temperatures will also differ. The curves 70, 71, 72, 73, 74 form a family of characteristic curves, on the basis of which the control device 62 determines the cooling output to be supplied by the cooling device, e.g., the required cooling air quantity.

The individual curves 70, 71, 72, 73, 74 can, for example, be determined empirically on startup of a blow-molding machine and then stored in the control device 62. They could also be preset at the factory, however, upon delivery of the machine.

The invention claimed is:

1. A method for tempering preforms is a blow-molding machine, comprising the steps of: arranging at least one heating box equipped with reflective walls along a transport path for the preforms, said heating box forming a heating channel; guiding the preforms through the heating channel in a transport direction, the heating box comprising heating elements for heating the preforms in the heating channel and at least one cooling device comprising a blower for cooling the reflective walls of the heating channel, wherein the cooling of the walls is achieved by a quantity of air flowing along the walls outside the heating channel, wherein heating output of the heating elements of the heating channel is adjustable; controlling the cooling of the reflective walls by adjusting cooling output of the cooling device with a control device that provides open-loop or closed-loop control of the cooling output of the cooling device as a function of an associated heating output of the heating elements of the heating channel; and monitoring a temperature of the reflective walls and/or of neck areas of the preforms with temperature sensors that are connected to the control device.

2. The method according to claim 1, wherein the control device controls the quantity of air flowing along the walls as a function of a measurement of the heating output.

3. The method according to claim 1, including arranging several heating boxes along the transport path in sequence in the transport direction to form a heating section formed by the heating channels of the heating boxes.

4. The method according to claim 3, wherein each of the heating boxes comprises its own cooling device and/or its own control device.

5. The method according to claim 1, including using at least a portion of the cooling output supplied by the cooling device to cool a neck area of the preforms.

6. The method according to claim 1, wherein the cooling device comprises at least one blower with a speed-controlled motor.

7. The method according to claim 2, wherein the cooling device comprises at least one throttle valve that influences the conveyed air quantity.

8. The method according to claim 2, wherein the control device adjusts the conveyed air quantity according to a preset characteristic curve as a function of the heating output of the heating elements of the heating channel.

9. The method according to claim 8, wherein several separately controllable heating boxes form a heating section, and the control device adjusts the conveyed air quality according to a preset family of characteristics as a function of the associated heating outputs of the individual heating boxes.

10. The method according to claim 1, wherein the control device increases the conveyed air-quantity when the temperatures of the reflective walls and/or of the neck areas of the preforms reach predetermined critical temperatures.

11. A device for tempering preforms in a blow-molding machine, the device comprising: a heating box having reflective walls that form a heating channel through which the preforms are guidable; heating elements arranged in the heating box for heating the preforms in the heating channel; at least one cooling device including a blower for cooling the reflective walls of the heating channel, wherein the cooling of the reflective walls is achieved by a quantity of air flowing along the reflective walls outside the heating channel, wherein heating output of the heating elements is adjustable; a control device configured for open-loop or closed-loop control of the cooling of the reflective walls by adjusting cooling output of the cooling device as a function of an associated heating output of the heating elements; and, temperature sensors connected to the control device to monitor a temperature of the reflective walls and/or neck areas of the preforms.

12. A blow-molding machine, comprising at least one device according to claim 11.

13. The method according to claim 1, including monitoring the temperature of the reflective walls and of neck areas of the preforms with the temperature sensors.

* * * * *